United States Patent [19]

Nishitani

[11] Patent Number: 4,670,676
[45] Date of Patent: Jun. 2, 1987

[54] RESET CIRCUIT

[75] Inventor: Kazuharu Nishitani, Itami, Japan

[73] Assignee: Mitsubishi Denki Kabushiki Kaisha, Tokyo, Japan

[21] Appl. No.: 691,762

[22] Filed: Jan. 15, 1985

[30] Foreign Application Priority Data

Apr. 5, 1984 [JP] Japan .................................. 59-69406

[51] Int. Cl.⁴ ..................... H03K 5/153; H03K 17/22; H03K 17/28; G06F 11/130
[52] U.S. Cl. .................................... 307/592; 307/597; 307/200 A; 307/603; 371/12; 371/62
[58] Field of Search ............... 307/200 A, 200 B, 592, 307/593, 595, 597, 598, 603; 371/12, 62; 377/31, 107; 365/226

[56] References Cited

U.S. PATENT DOCUMENTS

| | | | |
|---|---|---|---|
| 3,894,247 | 7/1975 | Jong ..................... | 307/592 |
| 4,367,422 | 1/1983 | Leslie ............................. | 307/592 X |
| 4,410,991 | 10/1983 | Lenart .............................. | 371/12 X |
| 4,419,596 | 12/1983 | Kikuchi ......................... | 307/593 X |
| 4,438,357 | 3/1984 | Wicnienski ..................... | 307/593 X |
| 4,464,584 | 8/1984 | Hentzschel ..................... | 307/592 X |
| 4,528,629 | 7/1985 | Breitling ......................... | 307/592 X |
| 4,531,198 | 7/1985 | Matsuda ........................... | 371/12 X |
| 4,541,050 | 9/1985 | Honda et al. ..................... | 371/12 X |
| 4,558,233 | 12/1985 | Nakamori ....................... | 307/594 X |

OTHER PUBLICATIONS

Blue et al. "Automatic Restart for Microprocessors", IBM Tech. Discl. Bull.; vol. 26, No. 10A, pp. 5319-5320; 3/1984.

Primary Examiner—Larry N. Anagnos
Attorney, Agent, or Firm—Lowe, Price, LeBlanc, Becker & Shur

[57] ABSTRACT

A reset circuit resets an internal circuit (3) included in an electronic apparatus. The internal circuit generates a pulse signal indicating that the internal circuit is in an enabled state. This pulse signal is supplied to an inverter (63) through an integrating circuit comprising a resistor (61) and a capacitor (62), so that the pulse signal in the inverter is inverted in polarity to be supplied to one input terminal of an AND gate as a reset inhibit signal. To the other input terminal of the AND gate is supplied a reset signal generated based on transient phenomena at the time of turning on of the DC power source. If the AND gate is closed by the reset inhibit signal, the internal circuit does not receive the reset signal from the AND gate. Accordingly, the internal circuit in operation will never be reset if the reset signal is supplied thereto.

6 Claims, 7 Drawing Figures

RESET CIRCUIT

BACKGROUND OF THE INVENTION

1. Field of the Invention

The present invention relates to a reset circuit. More particularly, the present invention relates to an improvement of a reset circuit to be utilized in an electronic apparatus using a microcomputer.

2. Description of the Prior Art

FIG. 1 is a schematic block diagram showing structure of a conventional reset circuit; FIG. 2 is a diagram showing a specific example of the conventional reset circuit shown in FIG. 1; and FIG. 3 is a waveform diagram showing operation of the FIG. 2 reset circuit at the time of turning on of the power source.

In an electronic apparatus containing a microcomputer, for example, a reset circuit as shown in FIG. 1 is employed for the purpose of resetting an internal logical circuit and the like. When in such a reset circuit, an input signal is supplied to a reset internal circuit 2 through an input terminal 1, a reset signal is generated from the reset internal circuit 2 so as to be supplied to an internal circuit 3. The internal circuit 3 is reset by this reset signal.

The reset internal circuit 2 comprises as shown in FIG. 2, an inverter 21 for inverting the polarity of the input signal. An input terminal of the inverter 21 is connected to a DC power source (not shown) through a resistor 22. The input terminal 1 is connected in a reference potential, that is, a ground level for example, through a capacitor 4. In an ordinary microcomputer, the resistor 22 and the inverter 21 are contained in an integrated circuit, while the capacitor 4 is attached externally. Consequently, the reset internal circuit 2 shown in FIG. 1 contains the resistor 22 and the inverter 21.

The reset circuit shown in FIG. 2 performs reset operation at the rise of DC voltage at the time of turning on of the power source. In the following, the reset operation will be described, with reference to FIG. 3. FIG. 3 shows waveforms concerning DC voltage a at the time of turning on of the power source, output voltage b of the inverter 21, voltage c in the reset input terminal 1 and transition voltage $V_{TR1}$ of the inverter 21, the abscissa representing time t and the ordinate representing voltage V.

First, at the time $t_0$, when the power source turns on, the DC voltage a rises. At this time, since the resistor 22 and the capacitor 4 constitute an RC series circuit, the voltage c of the reset input terminal 1 increases with a time constant determined by the resistor 22 and the capacitor 4. The transition voltage $V_{TR1}$ of the inverter 21 rises in proportion to the rise of the DC voltage a.

The inverter 21 provides an "H" level when the input applied thereto is lower than the transition voltage $V_{TR1}$, and it provides an "L" level when the input applied thereto is higher than the transition voltage $V_{TR1}$. Accordingly, in a period from $t_0$ to $t_1$ when the input voltage of the inverter 21, namely, the voltage c of the reset input terminal 1 is smaller than the transition voltage $V_{TR1}$, the output voltage b of the inverter 21 increases toward the "H" level so as to be maintained in the "H" level.

However, when the voltage c of the reset input terminal 1 becomes equal to the transition voltage $V_{TR1}$ at the time $t_1$ and then the magnitude relation therebetween is reversed, the output voltage b of the inverter 21 descends to the "L" level to be maintained thereafter in the "L" level. Accordingly, the output voltage b of the inverter 21 has a pulse shape and the internal circuit 3 is reset in a period of the "H" level of the pulse shape.

FIG. 4 is a schematic block diagram of a microcomputer circuit in which the conventional reset circuit shown in FIGS. 1 and 2 is applied. In this block diagram of FIG. 4, an internal circuit 3 comprises a programmable counter 31, a programmable ROM 32, an arithmetic and logic unit (ALU) 33, a RAM 34, an input-output control circuit 35, an input-output port 36 and an external transistor 37. To the programmable counter 31 and the input-output control circuit 35, a reset signal is supplied from the inverter 21. After the programmable counter 31 is reset in response to a reset signal, the programmable counter 31 counts clock pulses and supplies the output of the count to the programmable ROM 32 as an address signal. The programmable ROM 32 reads out a program from a predetermined address according to the address signal to supply the program to the arithmetic and logic unit (ALU) 33. The ALU 33 performs processing operation based on the program and stores the data in the RAM 34. On the other hand, the input-output control circuit 35 is reset in response to a reset signal to control the external transistor 37 through the input-output port 36. The collector output of the external transistor 37 serves as a control signal for turning on and off the power source of a television receiver for example.

The input-output port 36 shown in FIG. 4 serves as an input port and an output port and if this port serves as an output port at the time of turning on of the power source, an unfavorable influence might be exerted on an external system. More specifically stated, since the logical level of each circuit is not fixed till the ALU 33 executed the program of the programmable ROM 32 to set the internal state, the logical level is either the "H" level or the "L" level in case of the output state of the input-output port 36. If the input-output port 36 which is to operate as an input port is in the output state, an external signal output and an output of the microcomputer will be connected within the input-output port 36. If these outputs have different potentials, it is feared that a large current flows, causing damage to the microcomputer or the peripheral circuits.

For this reason, the input-output port 36 is controlled by the input-output control circuit 35 so that it serves as an input port in a period in which the output voltage of the inverter 21 is of the "H" level after the power source is turned on. At the time $t_1$ shown in FIG. 3, the output voltage of the inverter 21 becomes the "L" level and in consequence the microcomputer performs an initializing routine set in the programmable ROM 32. At this time, the microcomputer sets the respective components in the initial state and sets the input-output port 36 to serve as an output port. After such operation, the microcomputer advances to the main routine to repeat the operation in the main routine so that a normal state of operation of the system is maintained.

However, in case where a microcomputer to be operated is contained on a print-circuit board and is connected with other components of the circuit, the operation of the microcomputer is liable to be influenced by external noise. If the noise is applied to the reset input terminal 1, the output voltage b of the inverter 21 is caused to be in the "H" level and the program returns to the initializing routine although it should repeat th operation in the main routine. In other words, the system malfunctions due to the external noise. Let us take an example in which the external transistor 37 controls the turning on and off of the power source of a television receiver, the power source being turned on with the "L" level of the collector of the external transistor 37. In such an example, if the input-output port 36 is made to be in the input state due to external noise, the collector of the external transistor 37 becomes in the "H" level to turn off the television receiver, which sometimes causes a serious defect such as disappearance of the picture.

SUMMARY OF THE INVENTION

Therefore, a primary object of the present invention is to provide a reset circuit which will never make erroneous operation due to external noise and other unfavorable influences.

Briefly stated, according to the present invention, a reset signal for resetting an internal circuit is generated in response to an enabling signal applied to an input terminal. Then, it is determined whether the internal circuit is in a predetermined enabled state or not, and if the internal circuit is in the predetermined enabled state, application of the reset signal to the internal circuit is inhibited by reset inhibit means.

Consequently, in the present invention, since application of the reset signal to the internal circuit depends on the determination of the enabled state of the internal circuit, the internal circuit in the enabled state is never reset due to noise and the like.

In a preferred embodiment of the present invention, a reset signal is generated based on transient phenomena at the time of turning on of the DC power source and the internal circuit generates a pulse signal indicating the predetermined enabled state so that the pulse signal is integrated. If the integrated pulse signal is within a predetermined level, it is determined that the internal circuit is in the enabled state and a decision signal is supplied to a gate circuit so that the gate is closed. Thus, the reset signal is inhibited from being supplied to the internal circuit.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
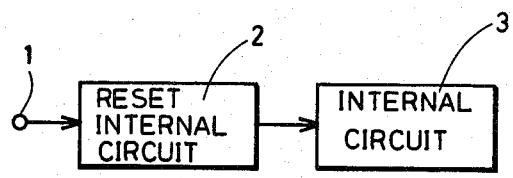
FIG. 1 is a schematic block diagram showing structure of a conventional reset circuit.
Figure 4:
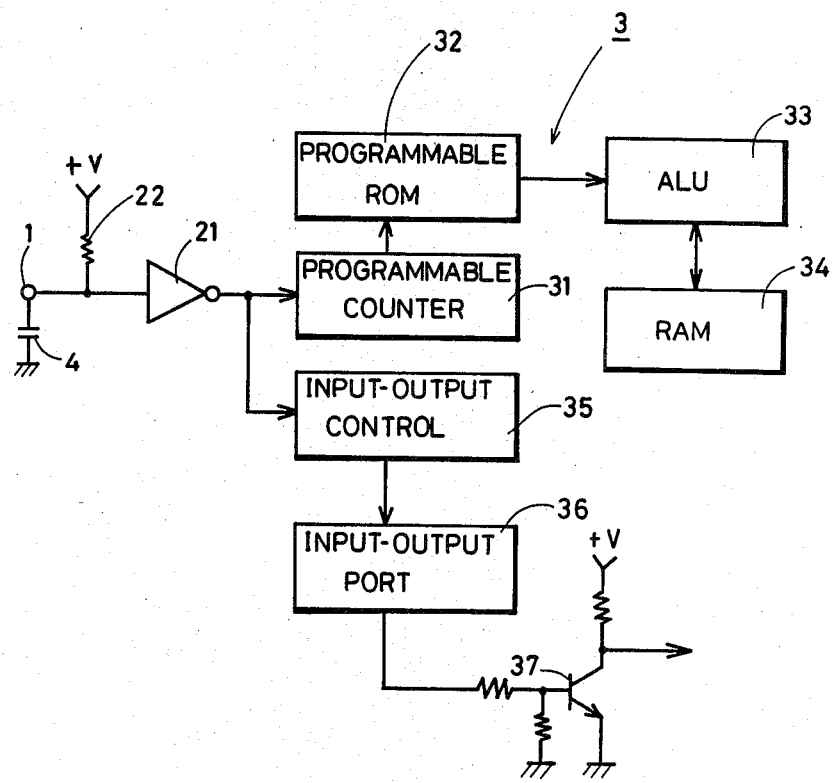
FIG. 4 is a schematic block diagram of a microcomputer circuit using a conventional reset circuit.
Figure 5:
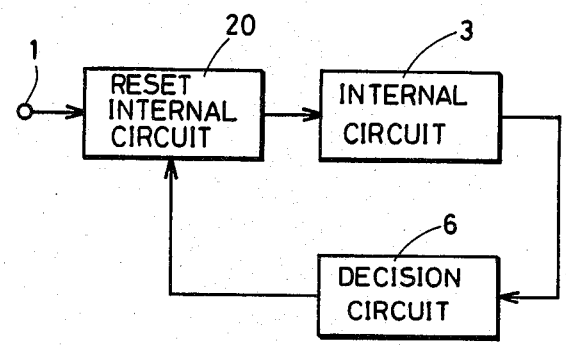
FIG. 5 is a schematic block diagram showing structure of an embodiment of the present invention.

FIG. 5 is a schematic block diagram showing structure of an embodiment of the present invention. A reset circuit shown in FIG. 5 comprises a reset internal circuit 20 and a decision circuit 6 as is different from the above described reset circuit shown in FIG. 1. The reset internal circuit 20 receives an input signal from a reset input terminal 1 and generates a reset signal according to the input signal. The reset signal thus generated is supplied to an internal circuit 3. As the internal circuit 3, a microcomputer as shown in FIG. 4 or the like is employed. When the internal circuit 3 is in a predetermined enabled state, it generates a signal indicating the enabled state and supplies the signal to the decision circuit 6. The decision circuit 6 receives the signal from the internal circuit 3 and determines whether the internal circuit 3 is in the predetermined enabled state. If the internal circuit 3 is in the predetermined enabled state, the decision circuit 6 supplies a reset inhibit signal to the reset internal circuit 20. When the reset inhibit signal is supplied to the reset internal circuit 20, it functions to inhibit application of the reset signal to the internal circuit 3.

Figure 2:
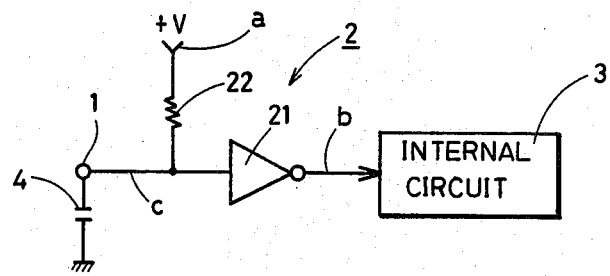
FIG. 2 is a diagram showing a specific example of the conventional reset circuit shown in FIG. 1.
Figure 6:
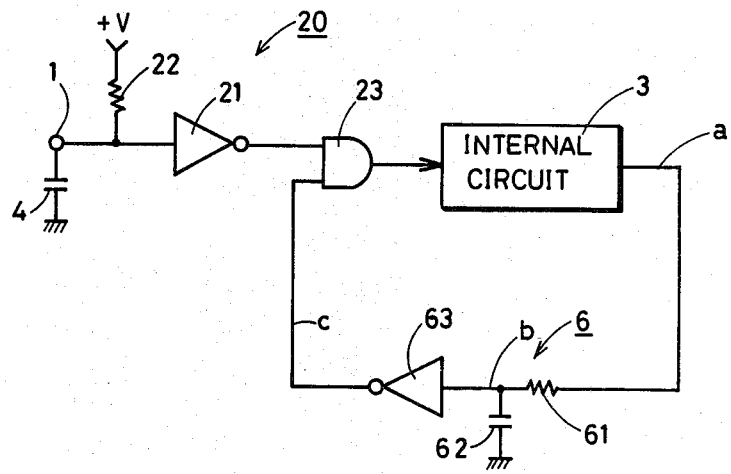
FIG. 6 is a specific electrical circuit diagram of the embodiment shown in FIG. 5.

FIG. 6 is a specific electrical circuit diagram of the embodiment shown in FIG. 5. Referring to FIG. 6, the structure of the embodiment will be described. The reset internal circuit 20 comprises an inverter 21, a resistor 22 and an AND gate 23. The inverter 21 and the resistor 22 are the same as those shown in FIG. 2. An output of the inverter 21 is supplied to one input terminal of the AND gate 23. When the internal circuit 3 becomes in the predetermined enabled state, a pulse signal a is generated. The pulse signal a is supplied to the decision circuit 6. The decision circuit 6 is structured by an integrating circuit comprising a resistor 61 and a capacitor 62 as well as by an inverter 63. The integrating circuit comprising the resistor 61 and the capacitor 62 serves to integrate the pulse signal a from the internal circuit 3 so as to provide a signal of a DC level. The signal thus integrated is supplied to the inverter 63. In the inverter 63, it is determined whether the DC level of the pulse signal a integrated by the itegrating circuit comprising the resistor 61 and the capacitor 62 is higher than the transition voltage $V_{TR1}$. If the DC level is lower than the transition voltage $V_{TR1}$, the inverter 63 provides a signal of the "H" level and if the DC level of the integrated signal is higher than the transition voltage $V_{TR1}$, it provides a reset inhibit signal c of the "L" level so that the signal c is supplied to the other input terminal of the above described AND gate 23. An output of the AND gate 23 is supplied to the internal circuit 3.

Figure 3:
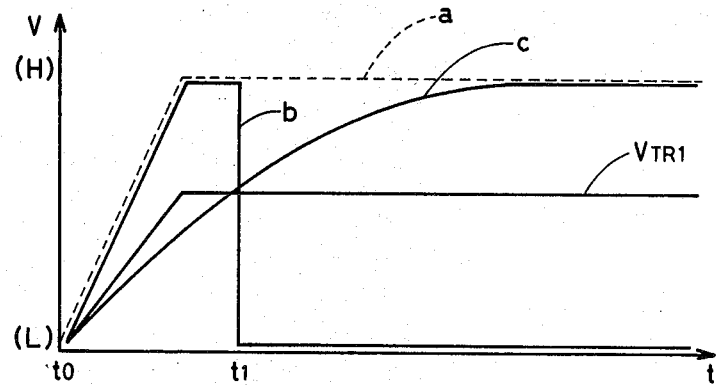
FIG. 3 is a waveform diagram showing operation of the FIG. 2 reset circuit at the time of turning on of the power source.
Figure 7:
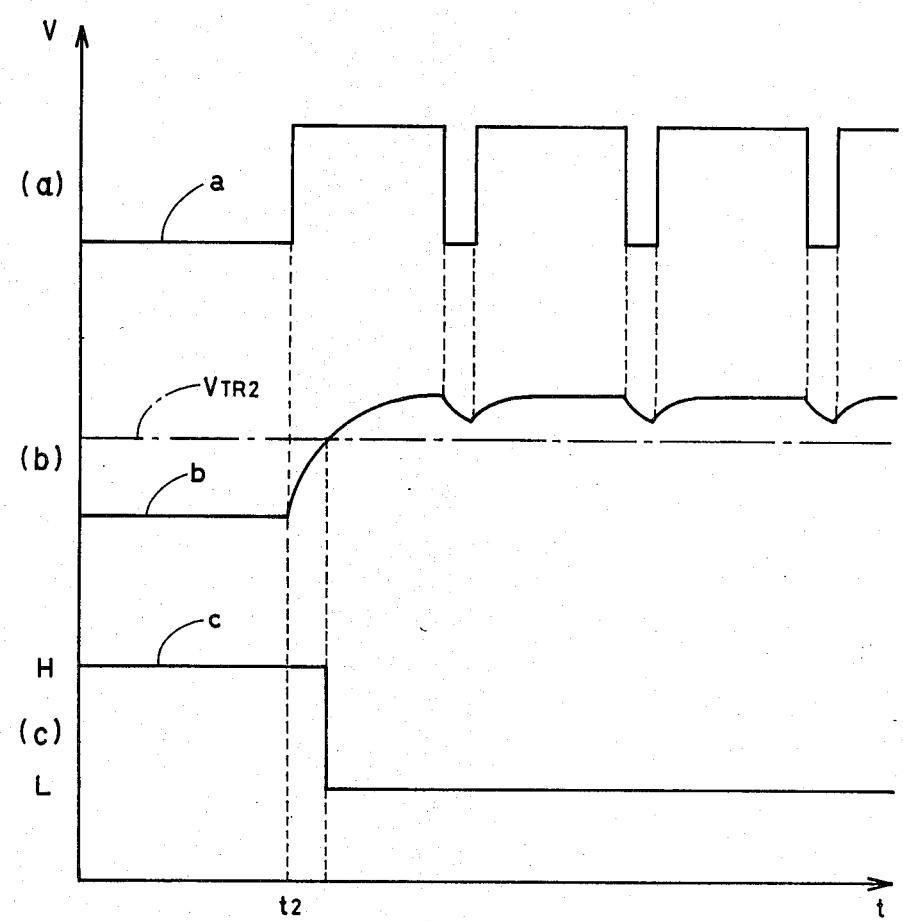
FIG. 7 is a diagram showing waveforms of the respective components in FIG. 6.

FIG. 7 is a diagram showing waveforms of the respective components shown in FIG. 6. Referring to FIG. 7, the operation of the reset circuit shown in FIG. 6 will be described. Since the operation at the time of turning on of the power source takes almost the same waveforms as the previously described waveforms shown in FIG. 3, description of the operation will be made by partially utilizing FIG. 3. First, when the DC power source turns on at the time $t_0$, the output of the inverter 21 becomes the "H" level as a result of the operation utilizing transient phenomena and after that, the output of the inverter 21 becomes the "L" level at the time $t_1$. The operation performed hitherto is the same as in the conventional reset internal circuit shown in FIG. 3.

In a period from the time $t_0$ to the time $t_1$, the output a of the internal circuit 3 is in the "L" level since the internal circuit 3 is not operated. Accordingly, the output c of the inverter 63 in this period is in the "H" level. As a result, the output of the AND gate 23 becomes the "H" level according to the output of the inverter 21 and then becomes the "L" level. The internal circuit 3 is reset when the output of the AND gate 23 becomes the "H" level.

Next, the operation of the reset circuit after the start of operating of the internal circuit 3 will be described. When the internal circuit 3 starts operation at the time $t_2$, the output a thereof takes a pulse shape as shown in FIG. 7(a). The pulse signal a from the internal circuit 3 is integrated by the integrating circuit comprising the resistor 61 and the capacitor 62 included in the decision circuit 6 and as shown in FIG. 7(b), the integrated output b becomes in a high level. If the circuit is preset such that the integrated output b is higher than the transition voltage $V_{TR2}$ of the inverter 63, the integrated output b is applied to the inverter 63 as the "H" level. Then, the polarity of the integrated output b is inverted by the inverter 63 so that the output becomes the "L" level as shown in FIG. 7(c).

As far as the internal circuit 3 provides the signal a having a pulse shape, the output c of the inverter 63 is maintained in the "L" level. As a result, the other input of the AND gate 23 is maintained in the "L" level during the operation of the internal circuit 3 and the gate is kept closed. Accordingly, if the voltage in the reset input terminal 1 becomes the "L" level because of mixing of noise and the output of the inverter 21 becomes in consequence the "H" level, the output of the AND gate 23 never becomes the "H" level. In other words, if a reset signal is applied to the internal circuit 3 during the operation due to noise, erroneous operation of the internal circuit 3 can be effectively prevented.

However, if it is feared that at the time of turning on of the power source, the output a of the internal circuit 3 becomes the same level as that of the power source voltage and that the output c of the inverter 63 becomes the "L" level at that time, it will be better to set to a larger value the time constant of the integrating circuit determined by the resistor 61 and the capacitor 62, as compared with the time constant determined by the resistor 22 and the capacitor 4, so that the internal circuit 3 can be reset in a reliable manner at the time of turning on of the power source.

Although in the above embodiment, the decision circuit 6 and the reset internal circuit 20 were shown in a specified manner, the present invention is not limited to those circuits. Other structure may be adopted as far as the necessary precision for the system is attained and the function of determining the enabled state of the internal circuit 3 and the function of inhibiting the reset thereof are performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reset circuit for resetting an internal circuit in an electronic apparatus, comprising:
   an input terminal for receiving an enabling signal for enabling said internal circuit,
   reset signal generating means responsive to said enabling signal for applying a reset signal to said internal circuit,
   said internal circuit including means for generating a pulse when said internal circuit is in an enabled state,
   determining means including an integrator connected to said internal circuit for integrating directly said pulse to provide an exponential waveform of the pulse itself in response thereto to determine that said internal circuit is in a predetermined enabled state, and in response to said exponential waveform, generating a decision signal, and
   reset inhibit means connected between an output of said reset signal generating means and a reset signal input of said internal circuit and responsive to said decision signal for inhibiting said reset signal from being supplied to said internal circuit when said internal circuit is in said predetermined enabled state.

2. A reset circuit in accordance with claim 1, wherein a microcomputer is included in said internal circuit of said electronic apparatus.

3. A reset circuit in accordance with claim 1, wherein said reset inhibit means comprises gate means for inhibiting application of said reset signal from said reset signal generating means to said internal circuit.

4. A reset circuit in accordance with claim 1, wherein said input terminal comprises a power source input terminal to which a DC power source is applied, and
   said reset signal generating means comprises means for generating said reset signal based on a transient signal at the time of turning on of said DC power source applied to said power source input terminal.

5. A reset circuit in accordance with claim 1, wherein said determining means further comprises:
   means for generating said decision signal if said pulse signal integrated by said integrator has a predetermined level.

6. A reset circuit in accordance with claim 5, wherein said integrator is set to have a time constant larger than the time constant of a transient signal occurring at the time of turning on of a DC power source.

* * * * *